US010342014B2

(12) United States Patent
Corbel et al.

(10) Patent No.: US 10,342,014 B2
(45) Date of Patent: Jul. 2, 2019

(54) METHOD OF SATELLITE COMMUNICATION WITH FLEXIBLE CAPACITY DISTRIBUTION BASED ON BEAM HOPPING AND ON A FRACTIONAL REUSE SCHEME

(71) Applicant: THALES, Courbevoie (FR)

(72) Inventors: Erwan Corbel, Toulouse (FR); Bernard Charrat, Toulouse (FR)

(73) Assignee: THALES, Courbevoie (FR)

( * ) Notice: Subject to any disclaimer, the term of this patent is extended or adjusted under 35 U.S.C. 154(b) by 289 days.

(21) Appl. No.: 15/377,878

(22) Filed: Dec. 13, 2016

(65) Prior Publication Data

US 2017/0181160 A1    Jun. 22, 2017

(30) Foreign Application Priority Data

Dec. 18, 2015   (FR) ..................... 15 02635

(51) Int. Cl.
| | |
|---|---|
| *H04L 1/00* | (2006.01) |
| *H04B 7/204* | (2006.01) |
| *H04W 72/04* | (2009.01) |
| *H04W 72/08* | (2009.01) |
| *H04W 84/06* | (2009.01) |
| *H04B 17/336* | (2015.01) |

(52) U.S. Cl.
CPC ...... *H04W 72/0446* (2013.01); *H04B 7/2041* (2013.01); *H04B 17/336* (2015.01); *H04L 1/0003* (2013.01); *H04L 1/0009* (2013.01); *H04W 72/0453* (2013.01); *H04W 72/0486* (2013.01); *H04W 72/085* (2013.01); *H04W 84/06* (2013.01)

(58) Field of Classification Search
CPC ................................. H04W 72/0446
USPC ........................................... 370/316
See application file for complete search history.

(56) References Cited

U.S. PATENT DOCUMENTS

| | | | | |
|---|---|---|---|---|
| 4,425,639 | A | * | 1/1984 | Acampora ........... H04B 7/2045 370/323 |
| 6,377,561 | B1 | | 4/2002 | Black et al. |
| 2010/0118764 | A1 | * | 5/2010 | Agarwal ............ H04B 7/18539 370/316 |

(Continued)

FOREIGN PATENT DOCUMENTS

EP    0 536 033 A2    4/1993

*Primary Examiner* — Brandon M Renner
*Assistant Examiner* — Abdeltif Ajid
(74) *Attorney, Agent, or Firm* — Baker & Hostetler LLP (57) ABSTRACT

A method, and associated equipment, for dynamically allocating resources in a satellite network comprising at least one satellite configured to form a plurality of satellite beams and terminals, comprises the steps of: clustering the beams into groups of beams, allocating frequency resources to each of the groups of beams, determining geographical zones in which these frequency resources can be used simultaneously, determining a hop frame comprising first timeslots, in which the frequency resources are allocated to the whole set of terminals of one of the beams of the group, and second timeslots, in which the frequency resources are allocated to a subset of terminals of at least one beam of the group, identifying the subset of terminals and allocating to the terminals of the frequency resources, and uploading of information relating to the overall loading of each of the beams.

14 Claims, 8 Drawing Sheets

(56) References Cited

U.S. PATENT DOCUMENTS

2012/0164941 A1 6/2012 Park
2013/0009809 A1 1/2013 Bert et al.
2014/0286236 A9 9/2014 Miller et al.

* cited by examiner

Prior Art

FIG.1

Prior Art

METHOD OF SATELLITE COMMUNICATION WITH FLEXIBLE CAPACITY DISTRIBUTION BASED ON BEAM HOPPING AND ON A FRACTIONAL REUSE SCHEME

CROSS-REFERENCE TO RELATED APPLICATIONS

This application claims priority to foreign French patent application No. FR 1502635, filed on Dec. 18, 2015, the disclosure of which is incorporated by reference in its entirety.

FIELD OF THE INVENTION

The invention lies in the field of high-capacity satellite communications systems, and pertains more particularly to a flexible method for allotting spectral resources within such a system.

It applies in particular to satellite communications systems of HTS type (the acronym standing for High-Throughput Satellite), the aim of which is to offer broadband access to fixed (residential or professional) terminals or mobile (professional, such as for example aeroplane) terminals.

BACKGROUND

The increase in the traffic and in the size of the contents transported in satellite communication networks is giving rise to an increase in the loading on these networks.

To cope with this increase in loading, it is necessary to implement efficient techniques for allocating resources within satellite networks, so as to increase the capacity of these networks, and also to afford them flexibility, by allocating the resources that they have to the locations where they are most required.

In order to increase the overall capacity of a satellite communications network, it is conventional to cut the geographical zone covered by the network into a plurality of sub-zones of smaller sizes, called satellite spots, illuminated by a beam of the satellite. The union of the set of these spots forms the geographical coverage zone, in a multibeam satellite system.

Cutting into beams makes it possible to improve the general capacity of the satellite network. Indeed, the antennas covering each of the beams being more directional, their gain, and therefore the link budget, is more favourable, thereby making it possible to use modulation and coding schemes of greater spectral efficiency. Moreover, when the spatial isolation between the spots, in terms of antenna gain, is sufficient, the same spectral resource can be used several times within the satellite network.

In order that the various beams not interfere with one another, the closest beams use distinct frequencies, the more distant beams being able to use like frequencies.

The general capacity of the satellite system is therefore a product of the capacity of each beam and of the total number of beams, the number of beams being limited by the beam-forming capacity of the antennas, the payload carrying capacity and the interference between beams, which vary as a function of the antenna patterns, of the frequency reuse scheme and of the size of the spots.

Recently, massively multibeam system architectures have been proposed to allow a communications satellite to attain capacities of greater than 150 Gbps. These are systems relying on the use of the Ka band, at least as regards the user half-link (that is to say the link between the gateway and the user terminal via the satellite). The obtaining of such a capacity relies on optimized payload architectures that are very efficient in terms of capacity per unit mass and per unit power.

Figure 1:
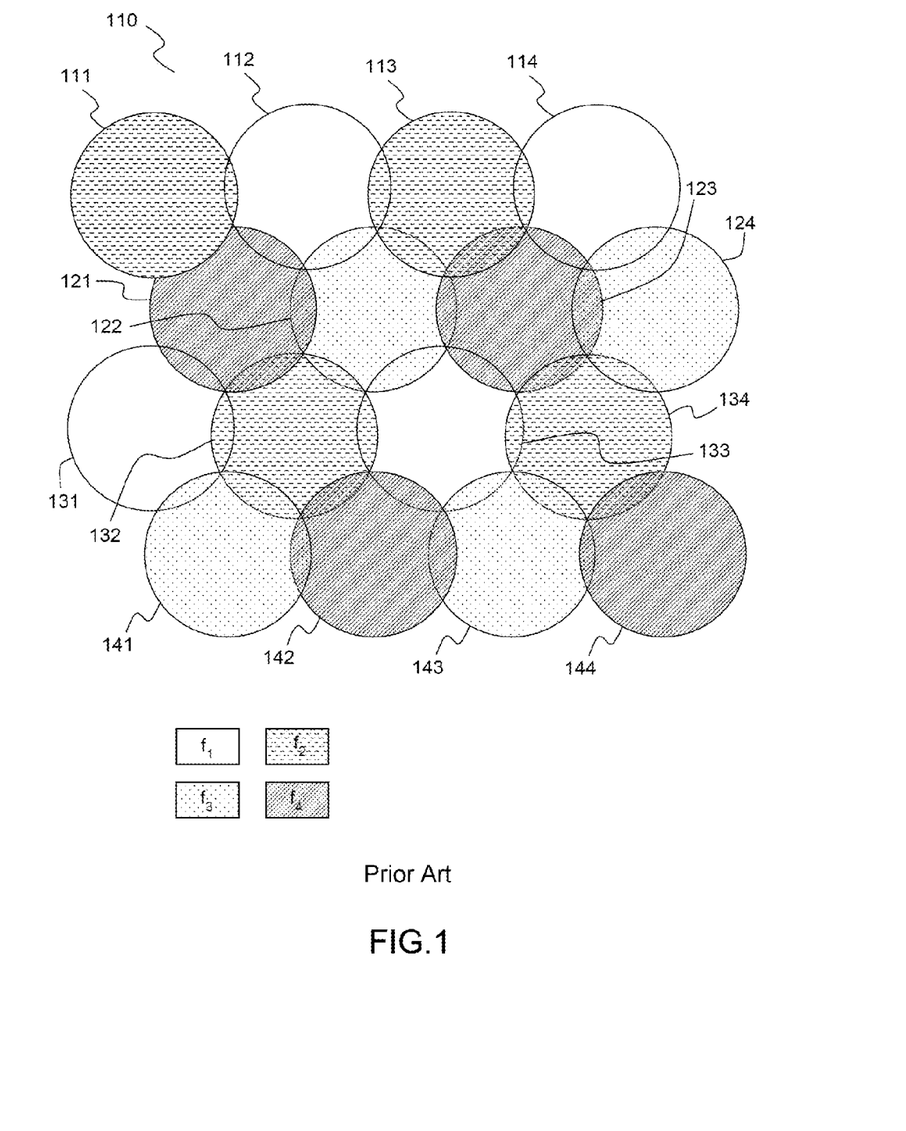
FIG. 1, already described, presents the result of a method for allocating satellite resources according to a known technique for frequency reuse, FIG. 2, already described, presents the result of a method for allocating satellite resources according to a known technique for fractional frequency reuse, FIG. 3a, already described, presents the result of a method of allocating satellite resources according to a beam hopping technique, FIG. 3b, already described, presents the problem of the increase in the loading in adjacent beams when the satellite resources are allocated according to a beam hopping technique.

FIG. 1 illustrates the result of a method of reusing resources according to the prior art, in which various spectral resources are allotted, or allocated, to various beams and reused so as to minimize the interference between the beams using the same bands. In the example, the reuse is done using a scheme with N=4 colours.

In FIG. 1, a geographical zone 110 is cut up into multiple beams 111 to 144. In the example, the total frequency resource allotted to the whole network is divided into four bands of frequencies: $f_1$, $f_2$, $f_3$ and $f_4$.

A band of frequencies is allotted to each of the beams, so as to maximize the gap between two beams using the same frequency resource. In the example, the frequency reuse scheme equals N=4, one then speaks of a reuse scheme with N colours. In this reuse scheme, one and the same frequency resource is never allotted to two adjacent beams, but can be reused by bi-adjacent beams. This is the case for example for the beams 112, 114, 131 and 133. The frequency resources $f_1$, $f_2$, $f_3$ and $f_4$ can each correspond to a quarter of the total band allotted to the network. Another implementation consists in allocating half the total band to the frequencies $f_1$ and $f_2$, and in using the same bands of frequencies as $f_1$ and $f_2$ in the orthogonal polarization for the bands of frequencies $f_3$ and $f_4$.

The presence of zones 151 of intersections between two satellite beams will be noted in FIG. 1. In these intersection zones, the frequency resources of several beams are received with comparable power levels.

Most of the time, the same quantity of spectral resources is allotted to each of the beams. They do not then make it possible to offer non-uniform capacity distribution over the service zone. However, analyses of the demand for capacity for future systems reveal wide geographical disparities, whose distribution may vary over time as a function of the evolution scenario of the market considered. The relevant metric in this situation is then no longer the overall capacity of the system, but the capacity from which value can actually be gleaned.

In order to cope with this disparity in demand over the whole of the network, it is therefore desirable to afford flexibility to the distribution of capacity. This requirement for flexibility pertains by priority to the outbound pathway (that is to say the link from the gateway to the user terminal via the satellite).

One way of satisfying the local spikes in demand for capacity is to increase the capacity of the whole set of beams of the satellite system. For this purpose, techniques for so-called fractional frequency reuse (known by the acronym FFR) are known to the person skilled in the art.

The method of fractional frequency reuse consists in overlaying two frequency reuse schemes. A first frequency resource is allotted to each of the beams according to a frequency reuse scheme with N colours, as in the frequency reuse method illustrated in FIG. 1, and then a second frequency resource is allotted to each of the beams, according to a reuse scheme with P colours, P lying between 1 and N. The frequency resources associated with the two colour schemes are distinct. The transmissions in the various beams are then done by combining the use of the resources associated with the scheme with P colours and the use of the resources associated with the scheme with N colours.

In the conventional case, P equals 2, or 1 when polarization diversity is used. An embodiment represented in FIG. 2 using polarization diversity, and in which N=4 and P=2, consists in dividing the frequency band into three sub-bands $f_1$, $f_2$ and $f_5$, the bands of frequencies associated with the scheme with N colours then being the sub-bands $f_1$, $f_2$, as well as the sub-bands $f_3$ and $f_4$, identical to $f_1$ and $f_2$ but in the orthogonal polarization. The bands of frequencies associated with the reuse scheme with P=2 colours then use the sub-band $f_5$, and the sub-band $f_6$ identical to $f_5$ but in orthogonal polarization.

In each beam, the use of the frequency resource allotted according to the scheme with P colours is reserved for the terminals for which the interference generated by the simultaneous use of these resources within other beams to which they are allotted does not disturb the communications. The identification of the terminals that are eligible to use this frequency resource is generally done on the basis of the geographical position of the terminal, the terminals situated at the centre of the satellite spot being the most liable to be robust to interference, on account of the directivity of the antennas used for each beam.

These terminals can then use the first and second frequency resources allotted to the beam to which they belong. The other terminals, which are less robust to interference, use only the frequency resources associated with the frequency reuse scheme with N colours. The overall capacity of the network is then increased, through the use of the second frequency resources.

The increase in the capacity of the network is related to the size of the zone comprising the terminals that can use the second frequency resource. This size depends on the system's transmission parameters; it must represent an appreciable portion of the spot so as to increase the capacity for this beam, but be limited so as not to increase the quantity of interference generated between the beams.

Figure 2:
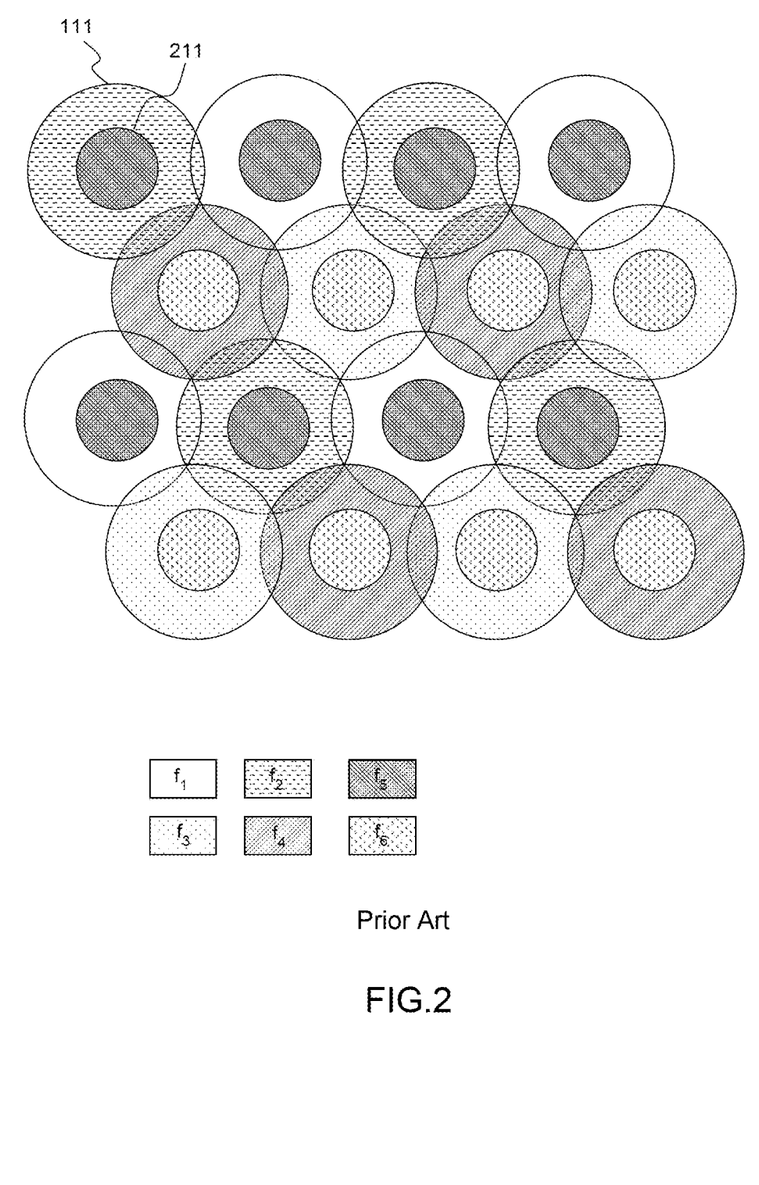

FIG. 2 illustrates the implementation of such a fractional frequency reuse method, in which a first reuse scheme with N=4 colours is used jointly with a reuse scheme with P=2 colours. In this embodiment, the terminals of the beam 111 that are situated in the zone 211, but also the terminals situated at the centre of beams whose colour is identical to that of the beam 111 in the reuse scheme with P=2 colours, such as for example the beams 112 to 114 and 131 to 134, can use one and the same second frequency resource $f_5$ whilst the beams 121 to 124 and 141 to 144 can use one and the same second frequency resource $f_6$.

Though the implementation of the fractional reuse of frequencies on all the beams makes it possible to increase the capacity of the system, it gives rise to a noticeable further complicating of the payload, in particular the power section. It is then suitable only when the bandwidth requirement on the half-link between the satellite and the gateway increases significantly, and is not really a response that copes with the geographical disparities in the requirement for capacity on the various beams.

Other techniques known to the person skilled in the art allow a gain in terms of capacity distribution flexibility.

A first technique consists of the use of a method of frequency reuse with N colours, and the allotting of more or less power to the various beams as a function of their loading. Since increasing the power makes it possible to improve the link budgets, it is therefore possible to use modulation and coding schemes having better spectral efficiency for these beams. However, the gain afforded by such a technique is limited, the power increase for a beam also giving rise to an increase in the level of the interference with the beams using the same frequency resource.

A second technique consists of the use of a method of frequency reuse with N colours, and the dynamic allocating of the terminals between the various beams so as to distribute the loading from a loaded beam to a less loaded beam. Indeed, the terminals situated in zones of intersections between two beams, or at the periphery of a beam, can be allotted equally to one or the other of the beams, thus making it possible to balance the loading of the beams, and therefore to afford flexibility. However, this technique is only moderately efficient since it relates to only a limited number of terminals. The link budget decreases very quickly when the technique selects terminals receding further from the edges of the beam.

Thereafter, a third technique consists in using a method of frequency reuse with N colours, and in optimizing the width of the frequency band allocated to the beams as a function of the loading, so as to allot more band to the beams having the largest demand for capacity. Although efficient as regards flexibility, the implementation of this technique requires the use of RF (Radio Frequency) components that can be reconfigured dynamically on the satellite. These components, such as for example RF filters or else switches, cause an appreciable increase in the mass and/or in the power consumed by the payload onboard the satellite. Flexibility is therefore obtained as a counterpart to an increase in the payload onboard the satellite.

Figure 3A:
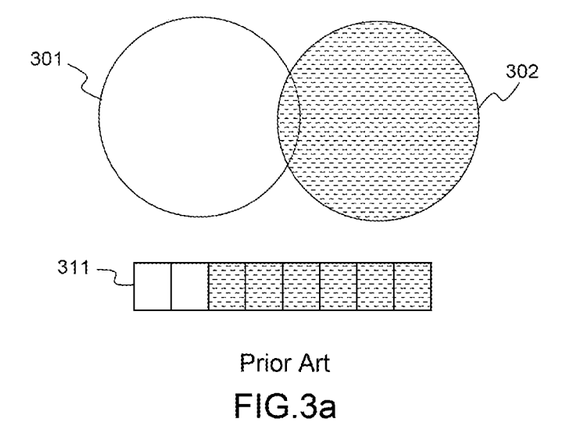

Finally, a fourth technique makes it possible to afford flexibility to the satellite network by allocating the resources to the various beams according to a so-called beam hopping method. This method defines a hop frame containing various timeslots, and carries out a temporal and frequency allocation of the resources to the various beams. Accordingly, groups of beams are constructed, which use one and the same frequency resource. The beams of the group are alternatively illuminated as a function of the allocation of the timeslots of the hop frame. By allocating more or fewer timeslots to the beams as a function of their loading, this method optimizes the use of the spectral resource, FIG. 3a illustrates such operation, in the case where the channels are grouped together in pairs. In FIG. 3a, the loading must be distributed between a first beam 301 and a second beam 302. The principle can be extended in an identical manner to a larger number of beams and to non-adjacent beams. In the example, the beam 302 is overloaded, while the beam 301 is under-loaded. The allotting of the timeslots of the hop frame 311 between the two beams will then favour the beam 302. In the example, two slots out of eight are allotted to the beam 301, and six slots out of eight are allotted to the beam 302. These beams using the same frequency resource, the beam 302 will therefore have 75% of the resource, with 25% for the beam 301. This method makes it possible to adapt the distributing of the resources as a function of requirements, and therefore to afford flexibility to the network.

In the particular case where 50% of the timeslots are allotted to each of the slots, and where the spots have the entire frequency resource, the capacity of each of the beams is equal to that obtained by a resource reuse method for which N equals 2 (4 when polarization diversity is used).

The sequentially allocated frequency band can consist of one or more carriers. It is then the whole set of carriers that is switched from one beam to the other.

Such a technique therefore affords a local response to the requirements for flexibility of the loading between two adjacent beams. At each instant, a single beam can have the whole set of frequency resources, this temporal separation making it possible to ensure the absence of interference between the various beams which share the hop frame. The use of components such as for example ferrite switches, makes it possible to carry out the fast switching function aboard the satellite (typically every millisecond), for limited extra payload mass in the satellite.

However, this solution does not make it possible to cope with the problem of the increase in the loading in a geographical zone comprising several beams.

Figure 3B:
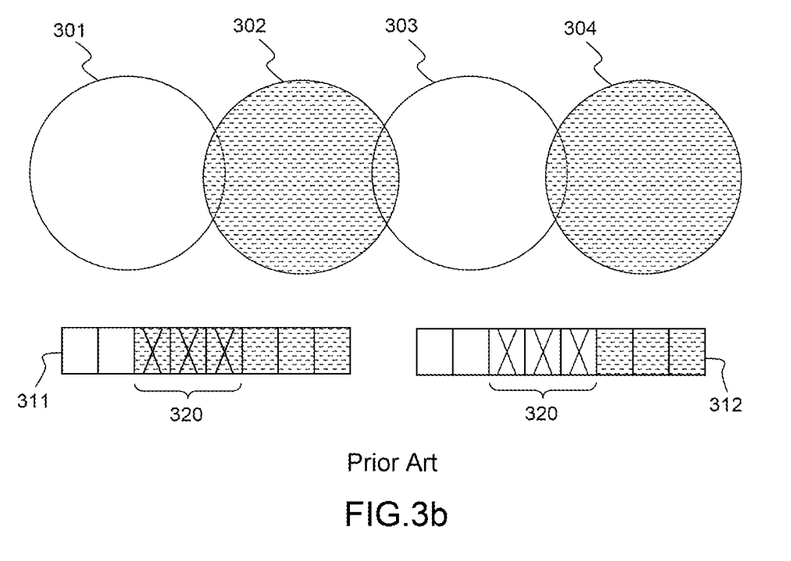

FIG. 3b illustrates this problem. To the beams of FIG. 3a are added the beams 303 and 304. The beam 303 is overloaded, and the beam 304 under-loaded. The increase in the loading of a satellite network usually being localized around a group of beams, this case is a commonplace practical case.

The use of a method of beam hopping then makes it possible to allot various timeslots to the beams 303 and 304 in the hop frame 312. In order to distribute the loading between the beams as a function of demand, five time slots are allotted to the beam 303 and three to the beam 304.

In this specific case, the beams 302 and 303, adjacent and lacking resources, both use the whole set of frequency resources in the timeslots 320. This use generates interference that reduces the capacity and the availability of the service at the edge of each of these beams, and will ultimately considerably degrade the overall capacity of the network.

The use of beam hopping therefore makes it possible to distribute the loading locally between adjacent beams, but does not solve the flexibility problem when the latter is envisaged over the whole network.

U.S. Pat. No. 6,377,561 B1 describes another way of satisfying the local spikes in demand for capacity, by grouping the beams into groups of adjacent beams, and by distributing the resources in frequency and in time inside each of these groups as a function of the loading. This technique affords flexibility at the level of a group of beams, but does not cope with the problem of flexibility when a high demand for capacity is localized on a group of adjacent beams, and does not solve the problems of interference between adjacent beams of groups of adjacent beams.

Patent application US 2014/0286236 A9 describes for its part a technique in which the allocations of frequencies to the beams are flexible over time and in space. However, this technique does not deal with the problems of interference between adjacent beams, and is therefore sub-optimal in terms of overall capacity.

SUMMARY OF THE INVENTION

The invention solves the problem of the flexibility of distribution of the capacity inside a multibeam satellite system, by using a specific scheme for fractional frequency resource allocation associated with a beam hopping mechanism. It thus makes it possible to reorganize the way in which the capacity is distributed over the whole of the satellite's coverage zone, and to improve the overall capacity of the network.

The invention applies to multibeam satellite communications networks. These networks generally use the Ka frequency band (27.5 GHz to 31 GHz), but the invention applies in an identical manner whatever the frequency band.

For this purpose, the invention describes a method for dynamically allocating resources in a satellite network comprising at least one satellite configured to form a plurality of satellite beams and terminals. The method comprises the steps, executed by a network supervisor of:

clustering of the beams into groups of beams on the basis of an item of information regarding overall loading of each of the beams allocating of frequency resources to each of the groups of beams, determination, within the beams of one and the same group and beams of different groups sharing common frequency resources, of geographical zones in which these frequency resources can be used simultaneously, and for each of the groups of beams on the basis of the overall loading of the beams and the geographical zones determined, determination of a hop frame, the said hop frame comprising first timeslots, in which the frequency resources are allocated to the whole set of terminals of one of the beams of the group of beams, and second timeslots, in which the frequency resources are allocated to a subset of terminals of at least one beam of the group of beams.

The method according to the invention also comprises steps executed by at least one controller which is associated with at least one of the satellite beams of:

identification, carried out for each of the beams, of the said subset of terminals and allocation to the terminals of the frequency resources associated with instants of sending in the timeslots of the hop frame, uploading to the supervisor of information relating to the overall loading of each of the beams associated therewith.

According to a preferential embodiment of the method according to the invention, during the second timeslots, the frequency resources are allocated to a subset of terminals of a single of the beams of the group of beams.

Advantageously, the hop frames of groups of beams sharing common frequency resources are synchronous. Still more advantageously, the hop frames of the whole set of groups of beams are synchronous.

Advantageously, the duration of the hop frames, the number of timeslots of the hop frames, and the position of the timeslots during which the frequency resources are allocated to a subset of terminals of at least one beam of the group of beams, are identical for groups of beams sharing common frequency resources.

According to one embodiment of the method according to the invention, the step of identifying the subset of terminals is carried out on the basis of the geographical position of the terminals.

According to another embodiment of the method according to the invention, the step of identifying the subset of terminals is carried out by measuring for each terminal a signal-to-noise plus interferer ratio (C/(N+I)).

According to one embodiment of the method according to the invention, the steps executed by a network supervisor are carried out periodically.

According to another embodiment of the method according to the invention, the steps executed by a network supervisor are carried out when at least one of the beams requires an adjustment of its capacity.

The invention deals furthermore with a network supervisor in a satellite network comprising at least one satellite configured to form a plurality of satellite beams, and terminals. The supervisor is characterized in that it is configured to carry out the first four steps of an embodiment of the method for dynamically allocating resources according to the invention.

The invention also deals with a network controller in a satellite network comprising at least one satellite configured to form a plurality of satellite beams, and terminals. The network controller is characterized in that it is associated with at least one of the satellite beams, and in that it is configured to carry out the last two steps of an embodiment of the method for dynamically allocating resources according to the invention for the beam or beams with which it is associated.

The invention deals moreover with a user terminal, which is characterized in that it is adapted to operate in a satellite network in which the resources of the network are allocated according to an embodiment of the invention, and in that it is configured to carry out:
- a first step of transmitting, to a network controller, an item of information making it possible to determine a membership in the subset of terminals that are able to use the timeslots in which the frequency resources are allocated to a subset of terminals of at least one beam of the group of beams,
- a second step of using resources transmitted by the said network controller to send and receive information.

Advantageously, the first step of transmitting information is carried out periodically.

According to one embodiment of the user terminal, the latter is configured to use a different modulation and data coding scheme depending on whether it transmits during a timeslot in which the frequency resources are allocated exclusively to the whole set of terminals of the beam to which it belongs, or whether it transmits during a timeslot in which the frequency resources are allocated to a subset of terminals of at least one beam.

Finally, the invention pertains to a satellite network comprising:
- a network supervisor such as described above,
- at least one network controller such as described above, and
- at least one user terminal such as described above.

BRIEF DESCRIPTION OF THE DRAWINGS

The invention will be better understood and other characteristics and advantages will be better apparent on reading the nonlimiting description which follows, and by virtue of the appended figures among which.

DETAILED DESCRIPTION

Figure 4A:
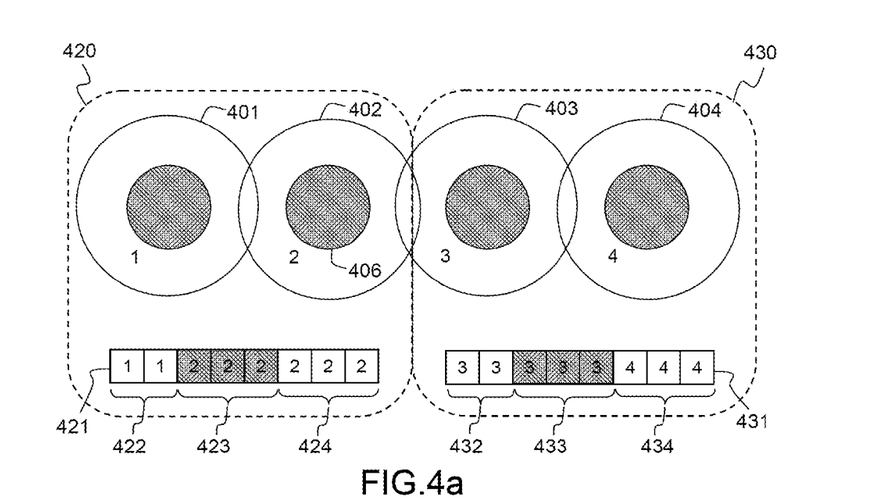
FIG. 4a represents a first embodiment of a method for allocating the satellite resources in a multibeam satellite network according to the invention.

FIG. 4a presents a first embodiment of the method for allocating the satellite resources in a multibeam satellite network according to the invention.

The example is limited to the representation of four beams, but applies in an identical manner when the number of beams varies.

The beams are represented in all the figures by roundels, which are schematic representations of a geographical zone. The position of the various beams, and their relative arrangement, could be different from what is represented in the figures by way of nonlimiting example, the transposition of the invention to different network arrangements not posing any particular problem to the person skilled in the art. These beams are formed by one or more satellites having one or more directional antennas, or antennas with controllable radiation pattern, such as for example active antennas. A multibeam satellite is suitable for forming a plurality of such beams, and consequently for simultaneously serving a plurality of different geographical zones.

In FIG. 4a, the beams 402 and 403 are overloaded (the traffic demanded by the user terminals of these beams is greater than the capacities of the beams), while the networks 401 and 404 are under-loaded. So as to afford them flexibility, groups of beams are created, while taking the overall loading of the network into consideration. Advantageously, these groups are constituted on the basis of a mixture of networks under-loaded and of networks overloaded. In FIG. 4a, the group 420 contains the beams 401 and 402, while the group 430 contains the beams 403 and 404. In the example, one and the same frequency resource is allotted to each of the groups of beams. The beams constituting a group are not necessarily adjacent. On the contrary, the groups are formed so as to equitably distribute the loading of the whole network while taking into account the constraints of interference between beams, and this may culminate in groups consisting of beams distributed over the whole of the satellite network.

A hop frame 421 is associated with the group 420. So as to distribute the loading of the beams as a function of the requirements, the frame contains timeslots 422, during which the frequency resources of the group are allotted exclusively to the terminals of the beam 401. The frame also contains timeslots 424 during which the frequency resources are allotted exclusively to the whole set of terminals of the beam 402, and timeslots 423 during which the frequency resources of the group can only be used by a subset of terminals in one or more beams of the group.

In the same manner, a hop frame 431 is associated with the group 430. It comprises timeslots 432 in which the frequency resources are exclusively allotted to the whole set of terminals of the beam 403, timeslots 434 in which the frequency resources are exclusively allotted to the whole set of terminals of the beam 404, and timeslots 433 in which the frequency resources are allotted to a subset of terminals in one or more beams of the group.

The groups 420 and 430 share the same frequency resources (i.e. in the example the whole set of frequency resources allotted to the network). Their hop frames must then be synchronized, and exhibit an identical structure, that is to say a duration, a number of timeslots, and a position of the timeslots during which the resources are allotted to a subset of terminals which are identical. In this manner, the use of the frequency resources on the whole set of beams of these groups is synchronized, and does not generate any undesirable interference between the transmissions in distinct beams. The use of synchronized hop frames having an identical structure is necessary provided that two groups have in common at least part of the frequency resources that are allotted to them.

In FIG. 4a, it is observed that, on account of the allotting of the timeslots in the hop frame, the adjacent beams 402 and 403 have in common only the timeslots 423 and 433. During these slots, the frequency resources are allotted to a subset of terminals for which the use of the same resources in neighbouring beams does not disturb operation. This subset of terminals can be determined according to their geographical positions. Indeed, the directivity of the antennas means that the closer the terminals are to the centre of the beam, the less they are impacted by the transmissions carried out in the other beams. The subset can also be determined by measuring a level of signal-to-noise plus interferer ratio (C/(N+I)) for each of the terminals, the terminals exhibiting a greater signal-to-noise over interferer ratio than a threshold then forming part of the subset.

Thus, for the beam 402, the subset 406 of terminals that can use the timeslots 423 common to all the beams of the group will mainly be the terminals situated in proximity to the centre, while the terminals at the beam boundary will use only the slot 424.

Advantageously, and so as to further decrease the level of the interference within a group, the timeslots in which the frequency resources are allotted to the subset of terminals of the group (i.e. in the example the slots 423 or 433) are dedicated exclusively to the subset of terminals of just one of the beams. This mode of operation is the preferential mode of operation on account of its simplicity of implementation. Indeed, the whole set of beams of the group is then served by one and the same repeater within the satellite, switches making it possible to modify access to the source of the antenna as a function of the timeslot in progress.

The method for allocating resources according to the invention firstly clusters the beams into groups of beams. This step is paramount to the proper course of the method. The beams are grouped together so as to maximize their chance of being complementary in terms of capacity. Thus, the beams exhibiting the most traffic are preferably grouped with those exhibiting the least traffic. The grouping is therefore done on criteria regarding overall analysis of demand on the scale of the whole of the satellite network. This grouping is complementary to the step of allotting the timeslots of the hop frames. The geographical position and the neighbourhood of the various beams must be taken into consideration, so as to take account of the interference between beams. Accordingly, the grouping will be done so as to guarantee a certain, configurable, distance between beams of different groups using the same frequency resources in common time slots (for example between the beams 401 and 403 during the timeslots 422 and 432). The grouping of the beams is therefore not necessarily carried out on the basis of neighbouring beams, but results from a complex optimization of the whole network. This grouping is alterable over time, as a function of the network loading variations. The capacity of the network to cope with geographically localized requirements will depend on this flexibility of pairing of the various beams of the satellite network. The method for grouping the beams into groups, for allotting the frequencies to the groups, and for allotting the timeslots to the various beams of the groups may therefore require several iterations to reach the optimal solution.

Thus, in the example, if the spots exhibiting a high demand had been the spots 401 and 402, the logical grouping of the beams would have been to group the beam 401 with the beam 404, and the beam 402 with the beam 403.

The hop frame 420 allots the frequency resources during the first two timeslots 422 to the beam 401, during the three timeslots 423 and during the three timeslots 424 to the beam 402. Thus, the beam 401 has 25% of the frequency resources, while the beam 402 has 75% of the resources, thus coping with the additional loading requirement on the beam 402.

Likewise, in the group 430 containing the beams 403 and 404 associated with the hop frame 431, the beam 403 has the frequency resources during the timeslots 432 and 433, while the beam 404 has same during the timeslot 424. Thus, the beam 403 has 62.5% of the frequency resources, while the beam 404 has 37.5% of the resources, thus coping with the additional loading requirement on the beam 403.

During the timeslots 423/433, the resources can be allocated equally to the subset of terminals of one or the other of the beams of one and the same group, or to all the subsets of terminals of the group. The subsets of terminals using these timeslots being selected with respect to their geographical position or their C/(N+I), the level of interference with the transmissions carried out in the neighbouring satellite beams is considerably reduced, in comparison with the prior art such as presented in FIG. 3b. The invention therefore copes well with the flexibility requirement needed in the event of increased loading on adjacent beams.

The loading of each of the beams is liable to vary over time. This is why the method according to the invention is carried out in a periodic manner, the duration of the period being configurable. In another embodiment, the method for allocating resources according to the invention is carried out as soon as the demand on one of the beams varies appreciably, and as soon as this alteration in demand requires an adjustment of the capacity of the beam.

Figure 4B:
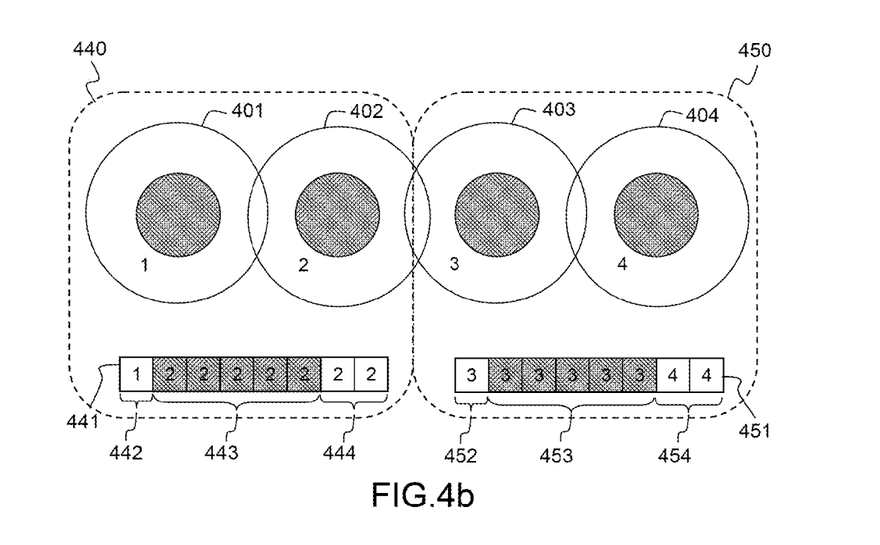
FIG. 4b presents a second embodiment of the method for allocating the satellite resources in a multibeam satellite network according to the invention.

FIG. 4b presents a second embodiment of the method for allocating the satellite resources in a multibeam satellite network according to the invention, in which the loading required by the beams has altered with respect to the case represented in FIG. 4a. In the example, the beams 402 and 403 require further resources while the beams 401 and 404 do not use the whole set of resources allotted to them.

The method is executed again. In the example, the grouping of the beams into groups has not altered, but a new hop frame structure is defined, making it possible to cope better with the requirement expressed. The frame 441 is associated with the group 420, and the frame 451 is associated with the group 430. In these frames, the number of timeslots in which the frequency resources are usable by the subset of terminals is increased, to the detriment of the number of timeslots in which the resources are specifically allotted to the whole set of terminals of the beams.

Thus, the hop frame 441 allots the frequency resources during the first timeslot 442 to the whole set of terminals of the beam 401, during the two timeslots 444 to the whole set of terminals of the beam 402, and during the five timeslots 443 to the subset of terminals of the beam 402. Likewise, the frequency resources are allotted during the first timeslot 452 to the whole set of terminals of the beam 403, during the two timeslots 454 to the whole set of terminals of the beam 404, and during the five timeslots 453 to the subset of terminals of the beam 403.

The beam 401 then has 12.5% of the resources, while the beam 402 now has 87.5% of the resources, thus increasing its capacity to serve the whole set of terminals of the beam with respect to the case presented in FIG. 4*a*. The same holds for the capacity allotted to the beam 403, which goes to 75%.

Figure 4C:
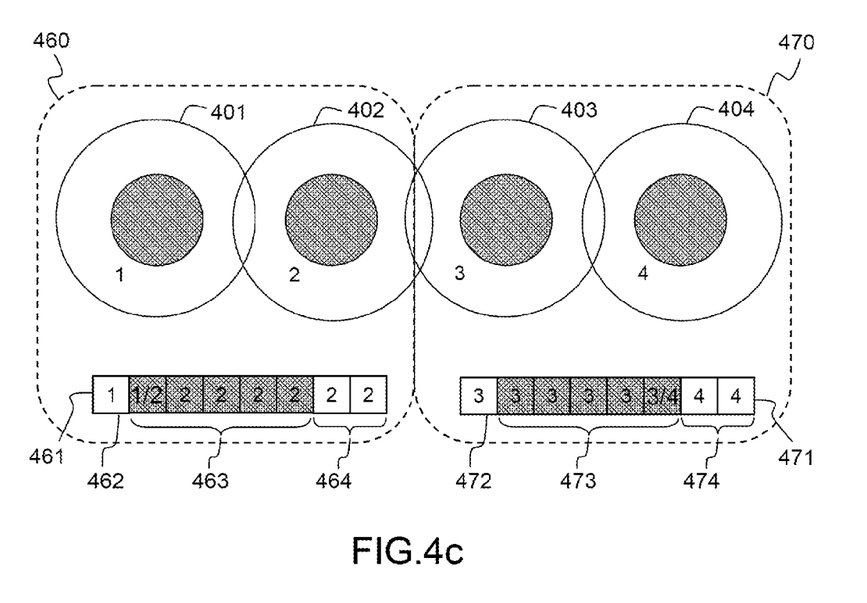
FIG. 4c presents a third embodiment of the method for allocating the satellite resources in a multibeam satellite network according to the invention.

FIG. 4*c* presents a third embodiment of the method for allocating the satellite resources in a multibeam satellite network according to the invention, in which the loading required by the beams has altered in a manner identical to the case presented in FIG. 4*b*. It differs from FIG. 4*b* by the fact that one and the same timeslot can be used simultaneously by subsets of terminals belonging to different beams within one and the same group.

However, in order to be able to compare the results obtained while retaining an equivalent consumption budget, the resources must be divided by the number of beams which share them in the same slot.

Thus, the beam 401 has 18.75% of the resources (⅛ of the resources for the timeslot 461, and 1/16 for the first timeslot of the group 463, while the beam 402 now has 81.25% of the resources, thus increasing its capacity to serve the whole set of terminals of the beam with respect to the case presented in FIG. 4*a*. The same holds for the capacity allotted to the beam 403, which goes to 68.75% and for that of the beam 404, which goes to 31.25%.

The invention therefore copes well with the flexibility requirement on the whole of the satellite network.

Figure 5A:
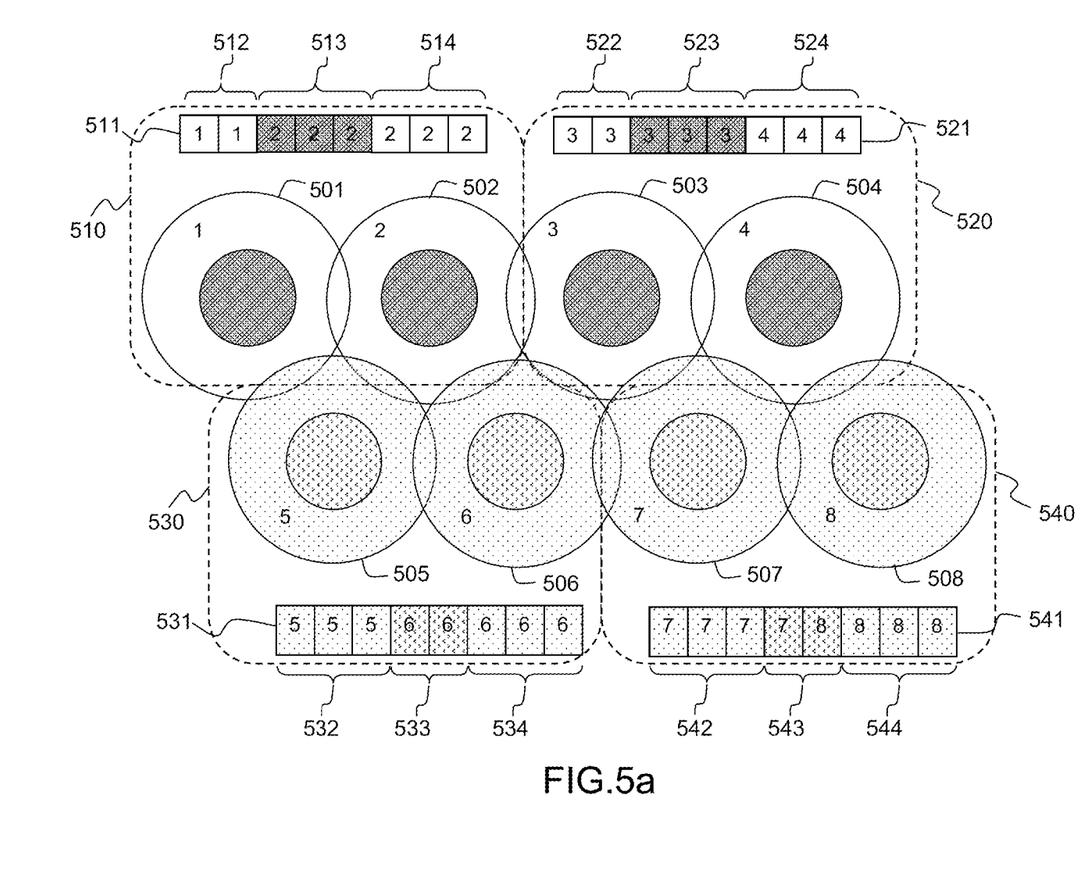
FIG. 5a represents a fourth embodiment of a method for allocating the satellite resources in a multibeam satellite network according to the invention.

FIG. 5*a* presents a fourth embodiment of a method for allocating the satellite resources in a multibeam satellite network, in which the beams 502, 503 and 506 require a greater than average quantity of resources, while the beams 501, 504 and 505 do not utilize the totality of the resources allotted to them. In FIG. 5*a*, frequency resources are used between the various groups of beams, this having an advantageous effect on the amount of interference between the beams, and therefore on the link budget of each beam.

The groups of beams 510 (beams 501 and 502), 520 (beams 503 and 504), 530 (beams 505 and 506) and 540 (beams 507 and 508) are then constructed. First frequency resources are allotted to the groups 510 and 520, second frequency resources are allotted to the groups 530 and 540.

These first resources and second resources can each correspond to half the total frequency band allocated to the satellite network. In a preferential embodiment, the first frequency resource comprises the whole of the frequency band allocated to the satellite network, the second frequency resource comprising the same frequency band, but in the polarization orthogonal to the first frequency resources.

The groups 510 and 520 using common frequency resources, the hop frames 511 and 512 which are associated with them have an identical structure, that is to say an identical duration, an identical number of timeslots, and a positioning of the timeslots in which the frequency resources are used by the subsets of terminals which are identical.

In the timeslots 512 of the hop frame 511, the frequency resources associated with the group 510 are allotted exclusively to the whole set of terminals of the beam 501. Likewise, in the timeslots 514, the resources of the group are allotted exclusively to the whole set of terminals of the beam 502. During the timeslots 513, the resources are allotted to the subsets of terminals that can use them without interfering with the beams using the same resources in the same timeslots. In the example, they are allocated exclusively to the subset of terminals of a single beam, 502. Thus, the beam 501 has 25% of the capacity of the network, while the beam 502 has 75%.

In an identical manner, the beam 503 has the timeslots 522 and 523, and therefore 62.5% of the frequency resources, while the beam 504 has the slots 524, and therefore 37.5% of the frequency resources.

The groups 530 and 540 use the second frequency resources.

Thus, the hop frames 531 and 541, respectively associated with these groups, can have a different structure from the hop frames 511 and 521 without generating interference.

The allotting of the timeslots to the beams makes it possible to raise the capacity of the beam 505 to 37.5%, that of the beam 506 to 62.5%, and those of the beams 506 and 507 to 50%.

This embodiment therefore copes well with the flexibility requirement, by allowing the beams 502, 503 and 506 to increase their capacity to the detriment of beams not using their full capacity, and therefore by distributing the loading over the whole of the network.

Figure 5B:
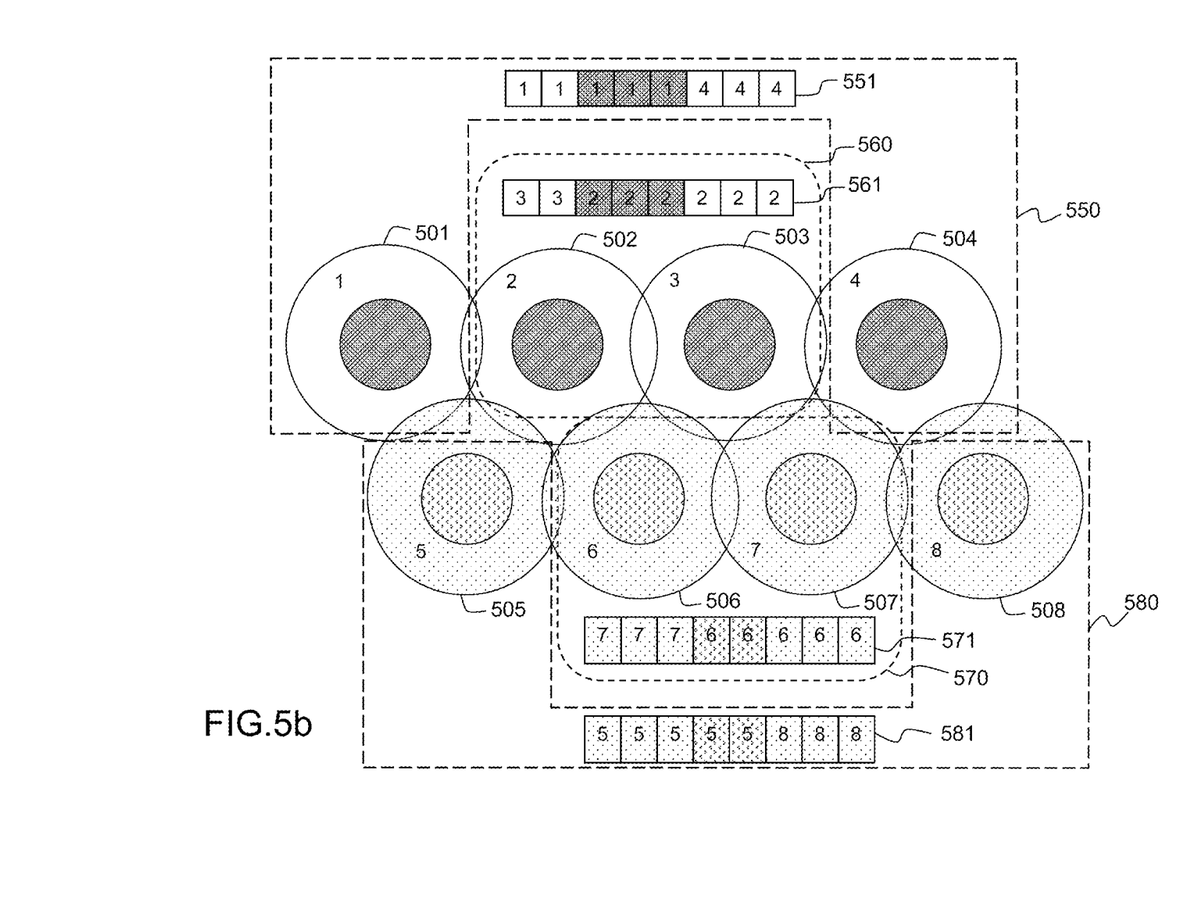
FIG. 5b represents a fifth embodiment of a method for allocating the satellite resources in a multibeam satellite network according to the invention.

FIG. 5*b* presents a fifth embodiment of a method for allocating the satellite resources in a multibeam satellite network, in which the beams requiring surplus capacity are the beams 501, 502 and 505.

In this embodiment, and so as to cope with the problematic issue of loading by considering it in an overall manner over the whole of the satellite network, the groups of beams are constructed as follows:

group 550: beams 501 and 504
group 560: beams 502 and 503
group 570: beams 506 and 507
group 580: beams 505 and 508.

The distribution of the timeslots given in FIG. 5*b* makes it possible to cope with the requirement for increased capacity of the beams 501, 502 and 505.

By virtue of the invention, the problem of capacity increase (with respect to the average capacity) for adjacent spots, that is to say forming part of a group of beams whose loading is greater than the capacity of the beam, is solved. This allows the system to benefit fully from the potential for flexibility of capacity distribution allowed by the onboard equipment that implements the beam hopping.

The method according to the invention is applied by constructing groups on the basis of two beams, but could be applied in an identical manner for a greater number of beams per group, or indeed for groups of beams whose size varies over time.

This method is also compatible with the method, known by the person skilled in the art and set forth previously, for adapting the power used by the various beams.

The implementational and operational constraints associated with the invention are as follows:

all the gateways of the satellite network must be synchronized with the beam switching device aboard the satellite, to allow the switching of the beams at the pace of the timeslots, however this synchronization is conventional within the framework of the use of a beam hopping system, the hop frames of the system using common frequency resources must be synchronized, even in a multi-gateway architecture, the terminals must be able to receive a stepwise temporally multiplexed stream, this being conventional within the framework of the use of a beam hopping system, management of the loading of the beams must make it possible to optimize the allocating of the timeslots in the hop frames to the various beams as a function of their loading. This management is the job of the supervisor of the access network.

Figure 6:
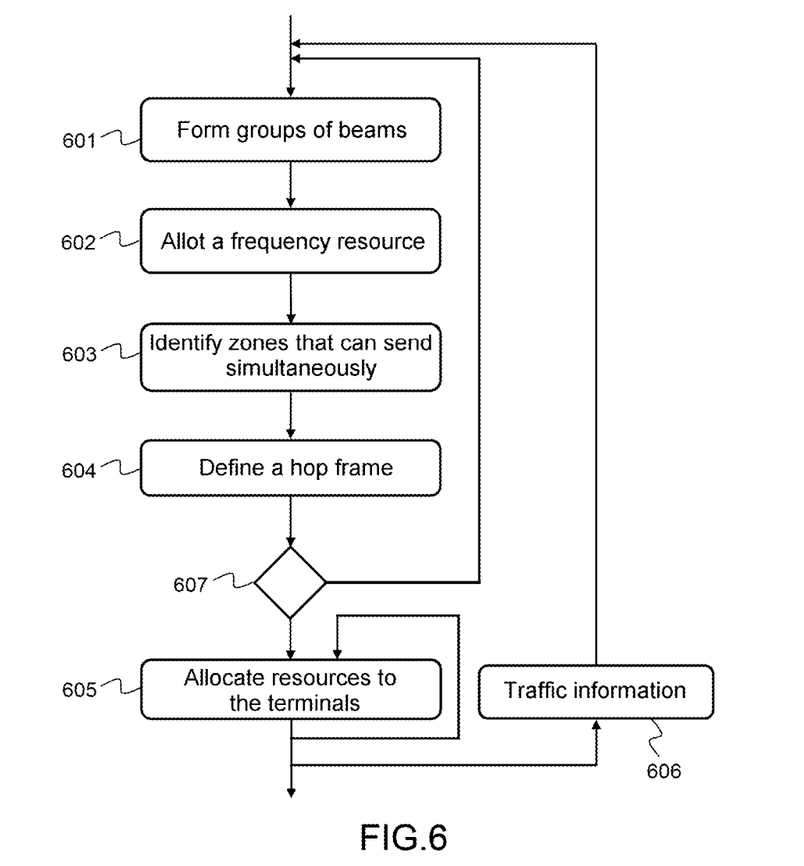
FIG. 6 presents the steps of the method according to the invention.

FIG. 6 presents the steps of the method according to the invention. The latter is situated in the context of a multibeam satellite network, and follows on from an initial planning phase making it possible to define the various beams of the coverage zone.

The method comprises the following steps:

a first step 601 of forming the groups of beams, carried out while considering the overall loading of the whole set of beams of the satellite network, a second step 602 of allotting a frequency resource to the groups of beams. According to the configuration choices made, this frequency resource may be identical for each of the groups, or differentiated.

a third step 603 of determining, within all the beams sharing common frequency resources, be they of one and the same group or of different groups, geographical zones in which the frequency resources can be used simultaneously in all the beams without the level of interference generated disturbing the communication links. This step does not specifically identify the terminals concerned, but only potential positions. Accordingly, link budgets are produced with each of the frequency reuse schemes. These link budgets make it possible to determine the theoretical interference between the users of the beams using the same frequency resources simultaneously, and therefore the zones that can use the same frequency resources simultaneously. In this manner, an approximation of the percentage of terminals concerned can be estimated. By virtue of this knowledge, it is possible to estimate the capacity that can be achieved in each beam, and thus to verify that the allocation of slots carried out during the next step satisfies the demand. This step is therefore necessary when dimensioning the hop frames, and in particular when choosing the number of timeslots associated with the use of the second frequency resources in the following steps.

a fourth step 604 of defining a hop frame for each of the groups of beams. This hop frame has a structure (duration, number of timeslots, position of the timeslots allotted to the subsets of terminals) which is common to the whole set of groups sharing one and the same frequency resource. The frequency resources associated with the group are distributed as a function of the timeslots. Two types of timeslots therefore exist: a first type (422, 424), during which the resources are allotted exclusively to the whole set of terminals of one of the beams, and a second type (423), during which the frequency resources are allotted to a subset of terminals of one or more beams of the group. The slots of one and the same type or which are associated with one and the same beam are not necessarily consecutive. The algorithm for allocating the timeslots to the beams endeavours to minimize the interference between beams, and to best serve the loading demanded by each of the beams. It must therefore be aware of the allocations carried out for the whole set of various hop frames, and notably of those for the groups using common frequency resources, as well as those for the groups having adjacent beams, a fifth step 605, of identifying within each beam a subset of terminals that can use a frequency resource in such a way that the interference with the transmissions carried out in the satellite beams using the same frequency resources simultaneously is limited, and then of allocating the resources to these terminals. The resources in question are the frequency resources and the timeslots which are distributed within a beam by the controller between the various terminals. Send instants are therefore allotted to each of the terminals, inside the timeslots of the frame associated with the beam, during which the terminals can use the frequency resources, and a sixth step 606 of uploading information on the overall loading of each of the beams.

The method as a whole may require several iterations before reaching an optimal solution. In particular, the groups created during step 601 do not necessarily make it possible to culminate in the definition of a hop frame, during step 604, which satisfies the traffic demand in the whole set of beams, and which guarantees the absence of interference between the various beams. The aim sought being to satisfy the bitrate requirements of the maximum of users, while guaranteeing access to a guaranteed minimum bitrate, several iterations of the first four steps of the method may be necessary, associated with a test 607 of appropriateness to the performance requirements sought.

Finally, when the groups, the distribution of the frequency resources between the groups, the determination of the geographical zones and the definition of the hop frames associated with each of the groups have been carried out satisfactorily, the resources are allocated to the various terminals.

According to one embodiment, during the fifth step 605 of the method according to the invention, each terminal transmits its position to the controller. On the basis of this information, the controller decides, by virtue of a benchmark, whether the terminal is eligible for the subset of terminals that can use the second timeslots. The instantaneous state of the system does not enter into account in the decision.

According to another embodiment, a terminal's membership of the subset can also be obtained by virtue of a message, transmitted by the terminal to the controller when it enters the network and/or periodically, indicating a level of signal-to-noise plus interferer ratio ($C/(N+I)$). This manner of operation makes it possible to broaden the base of the eligible positions and therefore the amplitude of the flexibility in capacity distribution by varying the criteria of membership in the subset of terminals as a function of the loading of the various beams of the network.

Finally, the identification of the terminals can be carried out by taking into account both its geographical position and a level of signal-to-noise plus interferer ratio.

Thus, within a beam, certain terminals communicate only during the timeslots in which the frequency resources are specifically allotted to the beam to which they belong, this being the case in particular for the terminals situated in proximity to the periphery of the beam. Other terminals can use at one and the same time the frequency resources during the timeslots allotted exclusively to the whole set of terminals of a beam or the timeslots allotted to a subset of terminals of at least one beam of the group of beams. These are generally the terminals situated in proximity to the centre of the beam.

Information relating to the overall state of the traffic within each beam is regularly uploaded, either periodically, or when the loading on one or more beams alters appreciably, or when one of the beams no longer has capacity to serve the terminals of its coverage zone. This information makes it possible to determine whether or not it is necessary to re-execute the set of steps of the method, so as to determine a network topology which copes with the alteration in demand.

The method according to the invention consists of diverse software steps executed by a reprogrammable computation machine, such as for example a processor, a microcontroller, or a digital signal processor (DSP), or by a dedicated computation machine, such as for example a set of logic gates such as an FPGA (the acronym standing for Field-Programmable Gate Array) or an ASIC (the acronym standing for Application Specific Integrated Circuit), or any other hardware module. The steps can be ported to one or the other of the items of equipment of the satellite network.

It is intended to be implemented in a satellite network comprising:

a network supervisor, responsible for managing the overall resources over the whole network. The supervisor carries out the first four steps of the method (601 to 604), namely the grouping of the beams, the allotting of the frequency resources to the various groups, the identifying of zones that can simultaneously use like frequency resources, and the defining of the hop frames. These steps can be iterated several times by the supervisor, so as to culminate in the most satisfactory solution possible. Finally, these steps can be carried out again, either in a periodic manner, or when the loading of the satellite network alters, so as to dynamically follow the alterations in the loading of the whole network. The supervisor is responsible for forming the groups, and for defining the frames, its role is not the management of the terminals belonging to the subset of terminals that can use the frequency resources simultaneously, and is based only on an arbitrary distribution of potential positions of the terminals and of a temporal traffic model for determining the format of the frames. The management of the terminals is the responsibility of one or more controllers, which determine the allocations of resources between the various terminals within the timeslots dedicated to them;

one or more network controllers, responsible for carrying out the fifth and sixth steps of the method 605 and 606 for the beams with which they are associated. The controllers may be colocated with the supervisor, or dispersed at the level of the various gateways of the network. They are responsible for managing one or more beams. They are aware on the one hand of the assignments of frequency and temporal resources carried out by the network supervisor for each of the beams for which they have responsibility, and on the other hand of the loading required by each of the terminals of the beams, as well as capacity requests issued by them, and information relating to their reception conditions (geographical position, signal-to-noise ratio or signal-to-noise over interferer ratio, error rate, etc.). On the basis of this information, the controllers can carry out step 605 of identifying the subsets of terminals that are eligible to use the frequency resources in the timeslots dedicated to these subsets of terminals, distribute these resources between the terminals, and determine the coding and modulation scheme employed by each of the user terminals. The step of identifying the terminals that are eligible for the subset of terminals is carried out continually and dynamically. It is generally carried out frame by frame, and is aimed at best adapting the distribution of the frequency and temporal resources of the beam as a function of the traffic profiles of the various user terminals, i.e. their changes of position of the terminals, the variations of the signal reception conditions, and the entry/exit of terminals in the network. Finally, the controllers carry out the step 606 of uploading to the network supervisor the requests for overall capacity, periodically or in the event of significant variation of the loading on the beam, on the basis of which requests the supervisor will decide whether or not to redefine the scheme for allotting the resources in the network; and at least one user terminal, whose geographical position guides membership in one or the other of the satellite beams.

In one embodiment of step 605 of the method according to the invention, executed on a network controller, the terminals belonging to a subset will be assigned frequency resources only during the timeslots allotted specifically to this subset of terminals.

In another embodiment of the method according to the invention, executed on a network controller, the terminals belonging to a subset transmit, that is to say send and receive, using a different modulation and coding scheme depending on whether they use the timeslots allotted to the subset of terminals or those allotted to the whole set of terminals of a beam.

Indeed, the use of the frequency resources during the timeslots specifically allotted to the whole set of terminals of the beam to which it belongs may be more advantageous than the use of the timeslots allotted to the subset of terminals, since during the first timeslots, they benefit from more favourable ratios C/(N+I), due to the larger distance between the beams using identical frequency resources.

The use of the timeslots in which the frequency resources are exclusively allotted to the whole set of terminals of a beam can then be made using a spectrally more efficient modulation and coding scheme than that used in the second timeslots. This embodiment then makes it possible to guarantee this terminal a minimum service quality, even when the propagation conditions are degraded, such as for example in the presence of rain, the links using the first timeslots then being more robust than the others to a signal-to-noise ratio degradation due to the degradations of the propagation channel.

In this case, an FMT loop (the acronym standing for Fade Mitigation Technique) for the use of frequency resources of each type can be put in place, so as to choose the optimal modulation and coding schemes.

The parameters of the modulation and coding scheme that is used by the communications transmitted to or from a user terminal are parameters that a controller responsible for the distributing of the loading within the beams can adjust so as to adapt the resources to the network loading.

In another embodiment of the method according to the invention, executed on a network controller, the terminals eligible to use the timeslots allotted to a subset of terminals use a combination of these timeslots and of the timeslots allotted exclusively to the whole set of terminals of a beam. The transmitted data are interleaved on this combination of timeslots, for which they use a suitable modulation and coding scheme that is spectrally more efficient during the timeslots allotted to the whole set of terminals of a beam and spectrally less efficient during the other timeslots.

The invention also pertains to a user terminal in a satellite network whose resources are allotted according to the invention.

Figure 7:
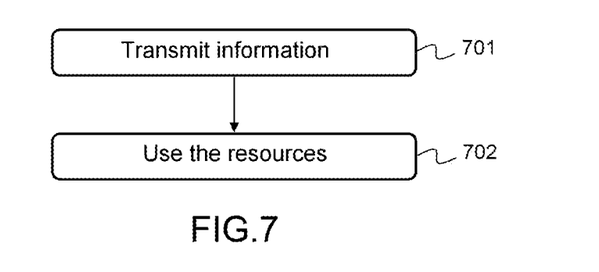
FIG. 7 represents the steps of an operating method of a user terminal in a satellite network according to the invention.

FIG. 7 represents the steps of an operating method of a user terminal in a satellite network according to the invention.

During the first step 701 of the method implemented at the level of a user terminal, the latter transmits information to the controller allowing it to determine its membership in the subset of terminals without overly degrading the quality of its transmission (the degradation of the transmission quality can be measured in terms of bit error rate or packet error rate).

This information can be geographical information in respect of a position, or C/(N+I) levels computed by the terminal during a carrier listening phase, and compared by the controller with criteria of eligibility to use these timeslots. The measurement of an error rate can also be an item of information transmitted to the controller. This measurement is carried out a first time when the user terminal enters the network, and then at regular intervals. When it enters the network, the terminal listens to a downgoing carrier which hops on several beams. It then receives frames (for example frames transmitted according to the DVB-S2 standard (the acronym standing for Digital Video Broadcasting-Satellite-Second Generation)) allowing it to evaluate a signal-to-noise plus interferer ratio (C/(N+I)) for the use of these frequencies. The controller takes this information into account when it determines the scheduling of the time-division multiplexing between the various user terminals.

The second step 702 of the method implemented at the level of the user terminals consists in using the temporal allocations, the frequency resources and the modulation/coding scheme transmitted by the controller to carry out the transmissions/receptions.

Finally, the invention covers a multibeam satellite network as a whole, comprising a network supervisor responsible for allocating the temporal and frequency resources to the various beams according to an embodiment of the method of the invention, one or more network controllers that are dispersed or colocated with the supervisor, and user terminals.

The invention claimed is:

1. A method for dynamically allocating resources in a satellite network comprising at least one satellite configured to form a plurality of satellite beams and terminals, the method comprising steps executed by a network supervisor:
   a first step of clustering the beams into groups of beams on the basis of an item of information regarding overall loading of each of the beams,
   a second step of allocating frequency resources to each of the groups of beams,
   a third step of determining, within the beams of one and the same group and beams of different groups sharing common frequency resources, geographical zones in which these frequency resources can be used simultaneously,
   a fourth step, carried out for each of the groups of beams on the basis of the overall loading of the beams and the geographical zones determined, of determining a hop frame, the said hop frame comprising first timeslots, in which the frequency resources are allocated to the whole set of terminals of one of the beams of the group of beams, and second timeslots, in which the frequency resources are allotted to a subset of terminals of at least one beam of the group of beams,
   and steps executed by at least one controller which is associated with at least one of the satellite beams:
      a fifth step, carried out for each of the beams, of identifying the said subset of terminals and of allocating to the terminals frequency resources associated with instants of sending in the timeslots of the hop frame,
      a sixth step of uploading to the supervisor information relating to the overall loading of each of the beams associated therewith.

2. The method for dynamically allocating resources in a satellite network according to claim 1, wherein, during the second timeslots, the frequency resources are allocated to a subset of terminals of a single of the beams of the group of beams.

3. The method for dynamically allocating resources in a satellite network according to claim 1, wherein the hop frames of groups of beams sharing common frequency resources are synchronous.

4. The method for dynamically allocating resources in a satellite network according to claim 1, wherein the duration of the hop frames, the number of timeslots of the hop frames, and the position of the timeslots during which the frequency resources are allocated to a subset of terminals of at least one beam of the group of beams, are identical for groups of beams sharing common frequency resources.

5. The method for dynamically allocating resources in a satellite network according to claim 1, wherein the fifth step of identifying the subset of terminals is carried out on the basis of the geographical position of the terminals.

6. The method for dynamically allocating resources in a satellite network according to claim 1, wherein the fifth step of identifying the subset of terminals is carried out by measuring for each terminal a signal-to-noise plus interferer ratio.

7. The method for dynamically allocating resources in a satellite network according to claim 1, wherein the first, second, third and fourth steps are carried out periodically.

8. The method for dynamically allocating resources in a satellite network according to claim 1, wherein the first, second and third and fourth steps are carried out when at least one of the beams requires an adjustment of its capacity.

9. A network supervisor in a satellite network comprising at least one satellite configured to form a plurality of satellite beams and terminals, configured to carry out the first step, the second step, the third step and the fourth step of a method for dynamically allocating resources according to claim 1.

10. The network controller in a satellite network comprising at least one satellite configured to form a plurality of satellite beams and terminals, associated with at least one of the satellite beams and configured to carry out the fifth and the sixth step of a method for dynamically allocating resources according to claim 1 for the beam or beams with which it is associated.

11. A user terminal adapted to operate in a satellite network in which the resources of the network are allocated according to claim 1, the user terminal comprising a reprogrammable computation machine configured to carry out:
   a first step of transmitting, to a network controller, an item of information making it possible to determine a membership in the subset of terminals that are able to use the timeslots in which the frequency resources are allocated to a subset of terminals of at least one beam of the group of beams,
   a second step of using resources transmitted by the said network controller so as to send and receive information.

12. The user terminal according to claim 11, wherein the first step of transmitting information is carried out periodically.

13. The user terminal according to claim 11, wherein the reprogrammable computation machine is configured to use a different modulation and data coding scheme depending on whether the user terminal transmits during a timeslot in which the frequency resources are allocated exclusively to the whole set of terminals of the beam to which it belongs, or whether the user terminal transmits during a timeslot in which the frequency resources are allocated to a subset of terminals of at least one beam.

14. A satellite network comprising at least one satellite configured to form a plurality of satellite beams and terminals, and further comprising:
- a network supervisor configured to carry out the first step, the second step, the third step and the fourth step of a method for dynamically allocating resources according to claim 1,
- at least one network controller associated with at least one of the satellite beams and configured to carry out the fifth and the sixth step of a method for dynamically allocating resources according to claim 1 for the beam or beams with which it is associated, and
- at least one user terminal adapted to operate in the satellite network in which the resources of the network are allocated according to claim 1, and configured to carry out:
  - a first step of transmitting, to a network controller, an item of information making it possible to determine a membership in the subset of terminals that are able to use the timeslots in which the frequency resources are allocated to a subset of terminals of at least one beam of the group of beams,
  - a second step of using resources transmitted by the said network controller so as to send and receive information.

* * * * *